Jan. 8, 1929.

H. R. TROTTER 1,697,937

RELIEF VALVE

Filed June 7, 1922

2 Sheets-Sheet 1

WITNESSES:

H. R. Trotter
INVENTOR

BY
ATTORNEY

Jan. 8, 1929.

H. R. TROTTER 1,697,937

RELIEF VALVE

Filed June 7, 1922

2 Sheets-Sheet 2

WITNESSES:

H. R. Trotter
INVENTOR

BY
ATTORNEY

Patented Jan. 8, 1929.

1,697,937

UNITED STATES PATENT OFFICE.

HENRY R. TROTTER, OF SWARTHMORE, PENNSYLVANIA, ASSIGNOR TO WESTINGHOUSE ELECTRIC AND MANUFACTURING COMPANY, A CORPORATION OF PENNSYLVANIA.

RELIEF VALVE.

Application filed June 7, 1922. Serial No. 566,675.

My invention relates to valves, and more particularly to fluid pressure relief valves such as are used in connection with steam pressure turbines to prevent the building up of excess pressures, and it has for an object the provision of apparatus of the character designated which shall serve to prevent the building up of such excess pressures by virtue of a rapid action on the attainment of a predetermined pressure in the apparatus to which it is connected.

Another object of my invention is to provide a relief valve which shall be simple, sturdy and reliable, and self-closing after the pressure has been reduced to or below that for which it is set to operate.

Figure 1:
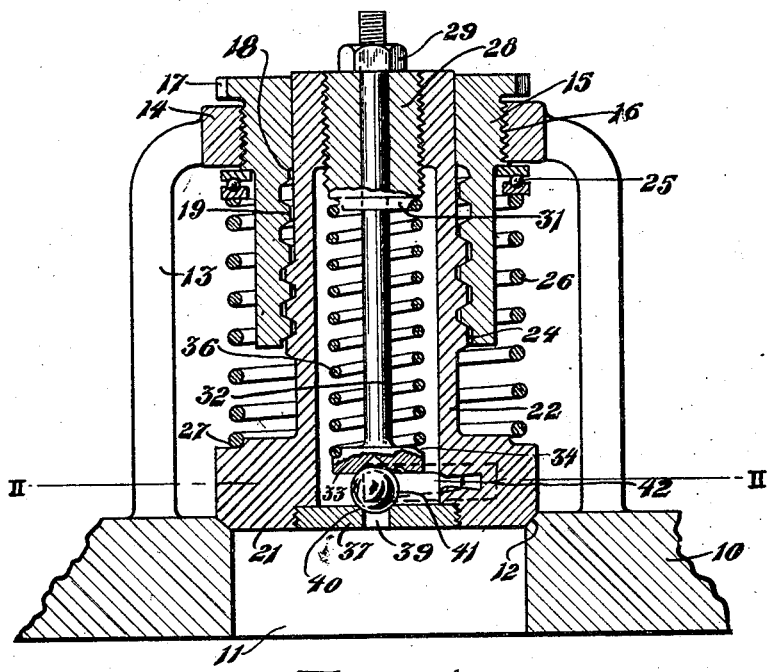
Figure 2:
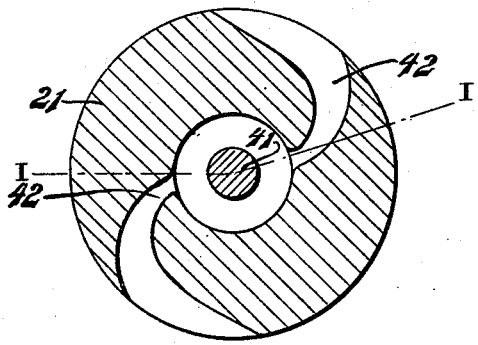
Figure 3:
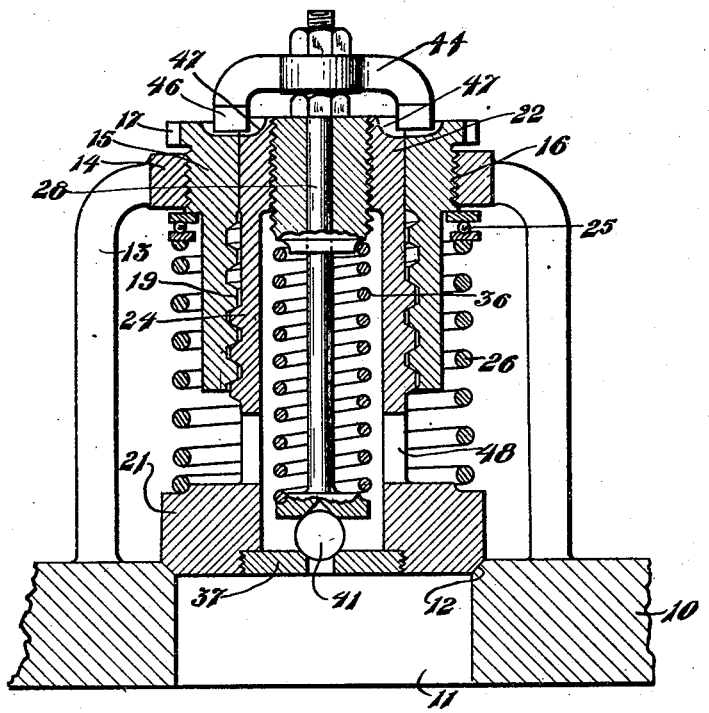

In the accompanying drawing, Fig. 1 is a view, partially in section and partially in elevation, of a valve structure embodying my invention; Fig. 2 is a sectional view, taken on the line II—II of Fig. 1, and Fig. 3 is a view, similar to Fig. 1, showing a modification of my invention.

In the operation of certain turbine installations, such, for example, as those in which the exhaust from a high pressure turbine is utilized in a number of low pressure turbines, it is frequently necesasry to shut down one or more of the low pressure units for inspection, repair or other reasons. Under these conditions, a relatively small increase in pressure in the high pressure unit may cause a dangerous pressure surge through the system, for the reason that there is no means of using the increased volume of low pressure steam exhausted from the high pressure machine in consequence of the increase of pressure therein. To guard against this contingency, relief valves are usually provided in the steam line between the high and low pressure units.

In the usual spring loaded relief valve, however, in which the valve opening is effected by the pressure of the steam against the spring, the initial opening of the valve compresses the spring and increases thereby its resistance to further opening of the valve. This may delay the operation of the valve to such an extent that before it can open sufficiently to relieve the pressure, the pressure will have built up to a dangerously high point.

By my invention there is provided a pressure relief valve in which the sluggish action of the simple, spring loaded relief valve is obviated, and which is actuated immediately on a predetermined pressure to its wide open position, relieving the pressure before it has an opportunity to build up.

Other structural details of my invention will be apparent from the subjoined description.

In the drawing, I have shown at 10 a portion of the wall of a chamber filled with a fluid under pressure. The wall 10 is provided with a relief port 11, the outer edge of which is ground to a bevel to provide a valve seat 12. Suitably attached to the outer surface of the wall 10 are a plurality of arms 13, which support a ring 14. The ring 14 is internally threaded for adjustable coaction with a hollow nut member 15, which is provided with male threads 16. The upper end of the nut member 15 is polygonal in shape, as indicated at 17, to provide ready means for adjusting its position with respect to the threaded ring 14. The inner face of the hollow nut member is counter-bored to form a shoulder 18, and the lower portion is provided with a female screw thread 19 of relatively steep pitch.

A valve 21, provided with a tubular stem portion 22, is mounted to coact with the valve seat 12 and thereby close the port 11. The upper portion of the tubular stem 22 is slidably and rotatably mounted in the unthreaded portion of the nut member 15 above the shoulder 18, as indicated at 23. The tubular stem portion 22 is also provided with steep pitch male threads 24, operatively engaging the threads 19 on the nut member 15. A compression spring 26 is mounted between an abutment 27 on the valve 21, and a rotatable abutment 25 on the nut member 15, and serves to urge the valve 21 against its seat 12. It is apparent that the initial compression of the spring 26 may be adjusted by screwing the nut member 15 up or down in its supporting member 14.

A sleeve member 28 is threaded into the upper portion of the tubular stem 22, and is provided at its upper end with an adjusting nut 29, and at its lower end with a spring abutment 31. Slidably mounted in the sleeve member 28 and projecting therethrough is a stem 32, provided at its lower end with an enlarged portion 33 on which is located a spring abutment 34, and urged downward by a compression spring 36, mounted between the spring abutments 31 and 34.

The valve 21 is provided with a disk 37, removably secured in the face thereof in any suitable manner, as by the threads 38. The disk 37 is provided with a port 39, in axial alinement with the valve 21 and the stem 32, which port 39 constitutes a passageway between the relief port 11 and the interior of the tubular stem 22. The upper edge of the port 39 forms a seat 40 for a pilot valve 41, which is urged against the seat 40 by the lower face of the enlarged portion 33 of the spring pressed stem 32. The pilot valve 41 is illustrated as being of the ball type, but it is to be understood that any suitable form of valve may be employed.

The valve 21 is also provided with a pair of reaction nozzles 42, formed in the body thereof in any suitable manner. The nozzles 42 are shown located in a plane normal to the axis of the valve 21, in such a manner that the reaction of jets of fluid caused to flow therethrough will set up a couple tending to rotate the valve 21 and its tubular stem 22. The nozzles are so directed that the rotation of the stem 22, caused by the torque of their reaction, will screw the stem into the nut member 15, and because of the steep pitch of the screw 24, this motion will rapidly raise the valve 21 from its seat.

In the operation of my device, the spring 36 is so adjusted that it will yield upon a predetermined fluid pressure, opening the pilot valve 41 and permitting fluid to escape through the port 39 and the nozzles 42. In consequence of this flow of fluid through the nozzles 42, a reactive couple is established, applying to the valve 21 and its tubular stem 22 a torque, causing it to rotate. The rotation of the stem 22 and the associated screw 24 causes a rapid lifting of the valve 21 from its seat 12, permitting the rapid escape of fluid until the pressure has been reduced to or below the predetermined point. When the desired reduction of pressure has been attained, the valves 21 and 41 are returned to their respective seats by means of the springs 26 and 36, the steep pitch of the screw 24 readily permitting this reverse movement of the valve 21.

In the modification of my device illustrated in Fig. 3, I show a structure in which the nozzles 42 are eliminated, and rotation of the valve is secured by virtue of the steep pitch screw 24 and its cooperating nut 19. A yoke 44 is suitably secured to the upper end of the pilot valve stem 32, and is provided with downwardly disposed dogs 46, adapted to engage in radial notches 47, cut in the upper surfaces of the nut member 15 and the tubular valve stem 22, in such a manner as to lock the valve stem and nut against relative rotation. The tubular valve stem 22 is provided with exhaust ports 48, so that the upper sides of the valves 21 and 41 are subjected to atmospheric pressure.

When the pressure on the ball valve 41 reaches such a point as to overcome the spring 36, the stem 32 is raised, lifting the dogs 46 out of engagement with the notches 47, so that the tubular stem 22 is free to turn with respect to the nut member 15. At the same time the fluid enters the tubular stem 22 and exhausts to atmosphere through the ports 48. The pressure acting upwardly on the lower side of the valve 21 has a component, which, acting on the steep pitch screw 24, rotates the tubular stem 22 in the nut member 15 to rapidly open the main valve 21 against the force exerted by the spring 26. Upon a suitable reduction in pressure, the springs 26 and 36 return their respective valves to their seats.

It will be apparent that manual operation of the valve may be secured by raising the stem 32, thus permitting a flow of fluid through the nozzles 42 irrespective of the pressure within the chamber.

While I have shown my invention in but two forms, it will be obvious to those skilled in the art that it is not so limited, but is susceptible of various other changes and modifications without departing from the spirit thereof, and I desire, therefore, that only such limitation shall be placed thereupon as are imposed by the prior art or as are specifically set forth in the appended claims.

What I claim is:

1. In a relief valve for fluids under pressure, a main valve, a screw adapted to open the main valve, means actuated by the fluid under pressure for operating the screw, and a pilot valve controlling the admission of the fluid to the said means.

2. In a relief valve for fluids under pressure, a main valve, a steep-pitch screw adapted to open the main valve, a spring adapted to close the main valve, means actuated by the fluid under pressure for operating the screw, and a pilot valve controlling the admission of the fluid to the said means.

3. In a relief valve for fluids under pressure, a main valve, a steep-pitch screw adapted to open the main valve, resilient means adapted to oppose opening movement of the main valve, means actuated by the fluid under pressure for operating the screw, and a pilot valve controlling the admission of the fluid to the said means.

4. In a relief valve for fluids under pressure, a main valve, a screw adapted to open the main valve, resilient means adapted to oppose opening movement of the main valve, means actuated by the fluid under pressure for operating the screw, and a pilot valve controlling the admission of the fluid to the said means, and means permitting the pilot valve to open at a predetermined fluid pressure.

5. In a relief valve for fluids under pressure, a main valve, a screw adapted to open the main valve, a main spring adapted to urge the main valve to its seat, means actuated by the fluid under pressure for operating the screw, a pilot valve controlling the admission of the fluid to the said means, and an adjustable spring adapted to urge the pilot valve to its seat, whereby said pilot valve is permitted to open at a predetermined fluid pressure.

6. In a relief valve for fluids under pressure, a main valve, a tubular stem therefor provided with a screw adapted to open the main valve, means associated with the main valve and actuated by the fluid under pressure for operating the screw, a pilot valve axially alined with the main valve and having a seat thereon, a main spring adapted to urge the main valve to its seat, and an adjustable spring adapted to urge the pilot valve to its seat, whereby said pilot valve is permitted to open at a predetermined fluid pressure.

7. In a relief valve for fluids under pressure, a main valve, a tubular stem therefor provided with a screw adapted to open the main valve, means associated with the main valve and actuated by the fluid under pressure adapted to rotate the screw, a pilot valve axially alined with the main valve and having a seat thereon, a main spring adapted to urge the main valve to its seat, and an adjustable spring adapted to urge the pilot valve to its seat, whereby said pilot valve is permitted to open at a predetermined fluid pressure.

8. In a relief valve for fluids under pressure, a main valve, a tubular stem therefor provided with a screw adapted to open the main valve, means comprising reaction nozzles actuated by the fluid under pressure adapted to operate the screw, and a pilot valve controlling the admission of fluid to the nozzles.

9. In a relief valve for fluids under pressure, a main valve, a tubular stem therefor provided with a screw adapted to open the main valve, reaction nozzles associated with the valve to actuate the screw, and a pilot valve controlling the admission of fluid to the nozzles.

10. In a relief valve for fluids under pressure, a main valve, a steep-pitch screw adapted to rapidly open the main valve, reaction nozzles associated with the valve to actuate the screw, a pilot valve controlling the admission of fluid to the nozzles, and spring means whereby the pilot valve opens before the main valve at a predetermined fluid pressure.

11. In a relief valve for fluids under pressure, a main valve provided with a tubular stem having a steep-pitch screw adapted to open the main valve, a nut member cooperating therewith, a spring adapted to close the main valve, a rotatable abutment for the spring carried by the nut member, a spring loaded pilot valve axially alined with the main valve and having a seat thereon, and reaction nozzles associated with the main valve and adapted to be actuated by the fluid under pressure controlled by the pilot valve, whereby the screw is rotated to rapidly open the main valve at a predetermined fluid pressure.

12. In a relief valve for fluids under pressure, a main valve provided with a tubular stem having a steep-pitch screw adapted to open the main valve, an adjustable nut member cooperating therewith, a spring adapted to close the main valve, and having a rotatable abutment carried by the nut member, an adjustable sleeve carried by the tubular stem in axial alinement therewith, a spring-actuated stem guided in the sleeve, a pilot valve seated thereby axially alined with the main valve, a removable seat therefor carried by the main valve, and nozzles disposed in the main valve transversely of the axis thereof and adapted to be operated by the fluid under pressure and controlled by the pilot valve, to rotate the screw and open the main valve at a predetermined pressure of the fluid.

13. The combination with a valve for controlling the flow of fluids, of a screw adapted to open the valve, an elastic-fluid motor for operating the screw, said motor including a rotor having a plurality of reaction nozzles, and a pilot valve responsive to pressure for supplying motive fluid to the nozzles.

14. The combination of a valve for controlling the flow of fluid, of a screw adapted to open the valve, resilient means adapted to oppose opening movements of the valve, an elastic-fluid motor for actuating the screw, said motor including a rotor having a plurality of impelling nozzles, and a pilot valve responsive to pressure for supplying motive fluid to the motor.

15. The combination with a valve for controlling the flow of fluid, of a screw adapted to open the valve, resilient means for opposing opening movements of the valve, an elastic-fluid motor for actuating the screw, said motor including a rotor having a plurality of impelling nozzles, and a pilot valve for controlling the admission of motive fluid to the motor.

16. The combination with a valve for controlling the flow of fluid, of reaction nozzles for actuating the valve, means for conveying motive fluid under pressure to the nozzles, and independent valve means responsive to a predetermined pressure for controlling the supply of motive fluid to the nozzles.

17. The combination with a relief valve, of an elastic fluid motor for actuating the valve, said motor including a rotor having a plurality of nozzles, and a pilot valve operating independently of said rotor and in response to pressure for conveying motive fluid to the nozzles.

18. The combination with a valve for controlling the flow of fluid, of nozzles for actuating the valve, and a pilot valve operating independently of said nozzles and in response to fluid pressure for conveying fluid under pressure to the nozzles.

In testimony whereof, I have hereunto subscribed my name this 5th day of June, 1922.

HENRY R. TROTTER.